(12) United States Patent
Dudar

(10) Patent No.: US 12,730,443 B2
(45) Date of Patent: Sep. 8, 2026

(54) MULTI DIRECTIONAL DRIVE MODE FOR AN ELECTRIC VEHICLE

(71) Applicant: Ford Global Technologies, LLC, Dearborn, MI (US)

(72) Inventor: Aed M. Dudar, Canton, MI (US)

( * ) Notice: Subject to any disclaimer, the term of this patent is extended or adjusted under 35 U.S.C. 154(b) by 231 days.

(21) Appl. No.: 18/486,804

(22) Filed: Oct. 13, 2023

(65) Prior Publication Data

US 2025/0123618 A1 Apr. 17, 2025

(51) Int. Cl.
*G05D 1/00* (2024.01)
*B60N 2/00* (2006.01)
*B60N 2/04* (2006.01)

(52) U.S. Cl.
CPC ......... *G05D 1/0016* (2013.01); *B60N 2/0027* (2023.08); *B60N 2/04* (2013.01); *G05D 1/0038* (2013.01)

(58) Field of Classification Search
CPC .. G05D 1/0016; G05D 1/0038; B60N 2/0027; B60N 2/04
See application file for complete search history.

(56) References Cited

U.S. PATENT DOCUMENTS 6,505,695 B2 1/2003 Oshima et al.
8,757,309 B2 6/2014 Schmitt et al.
9,815,388 B1 * 11/2017 Lindsay ............... B60N 2/0248
10,442,479 B2 10/2019 Chan et al.
12,090,923 B1 * 9/2024 Sawant ................... B60Q 3/54
2020/0171979 A1 * 6/2020 Yetukuri ................. B60N 2/01
2021/0064051 A1 * 3/2021 Dudar .................... B60N 2/002
2021/0146804 A1 * 5/2021 Tanabe ................... B60N 2/688
2021/0309123 A1 * 10/2021 Kang ....................... B60N 2/14
2021/0309124 A1 * 10/2021 Fields .................. B60N 2/0276
2021/0380165 A1 * 12/2021 Chao .................... B62D 7/1509
2022/0024491 A1 * 1/2022 Lee ........................ B60K 35/28
2023/0406100 A1 * 12/2023 Ahn ....................... B60K 35/22
2024/0025304 A1 * 1/2024 Fu ............................ B60N 2/14

OTHER PUBLICATIONS

Zutao Zhang, et al., A Novel Steering System for a Space-Saving 4WS4WD Electric Vehicle: Design, Modeling, and Road Tests, IEEE Transactions on Intelligent Transportation Systems, www.ieee.org/publications/rights/, May 20, 2016, pp. 1-14.
Huihuan Qian, et al., System and Design of an Omni-Directional Vehicle, IEEE International Conference on Robotics and Biomimetics Bangkok, Thailand, Feb. 21-26, 2009, pp. 389-394.

* cited by examiner

*Primary Examiner* — Hitesh Patel
*Assistant Examiner* — Eisen Yim
(74) *Attorney, Agent, or Firm* — Emily Campbell; Eversheds Sutherland (US) LLP

(57) ABSTRACT

A vehicle including a sitting area, a transceiver and a processor is disclosed. The sitting area may be configured to swivel about a sitting area axis. The transceiver may be configured to receive a user request to move the vehicle in a first direction. The processor may be configured to obtain the user request and determine a sitting area orientation based on the first direction responsive to obtaining the user request. The processor may further cause the sitting area to swivel to the determined sitting area orientation. The processor may be additionally configured to obtain a user input to maneuver vehicle movement in the first direction responsive to causing the sitting area to swivel to the sitting area orientation, and cause the vehicle to move in the first direction based on the user input.

20 Claims, 7 Drawing Sheets

MULTI DIRECTIONAL DRIVE MODE FOR AN ELECTRIC VEHICLE

FIELD

The present disclosure relates to an electric vehicle (EV) and more particularly to a multi-directional drive mode for an EV.

BACKGROUND

Driving in a narrow or tight space may be cumbersome for a vehicle operator. For example, when the vehicle operator may have driven a vehicle a long distance on a narrow road (such as on a mountain trail, alley, etc.) and encounters an obstruction or a road closure, the vehicle operator may find it difficult to maneuver vehicle movement as turning the vehicle may not be possible due to narrow or tight space. In such scenarios, the vehicle operator may have to move the vehicle in a reverse direction for an extended time duration and find an alternative route to vehicle's destination location. Similarly, the vehicle operator may face inconvenience when the vehicle may be stuck in mud, snow, or sand.

Vehicle operators are generally accustomed to driving the vehicles in the forward direction, and hence driving the vehicle in the reverse direction for the extended time duration may cause inconvenience to the vehicle operator. Further, driving the vehicle in the reverse direction may be challenging as the vehicle operator may not have an adequate field of view to drive the vehicle. In addition, the vehicle operator may face motion sickness/anxiety due to vehicle movement in the reverse direction.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
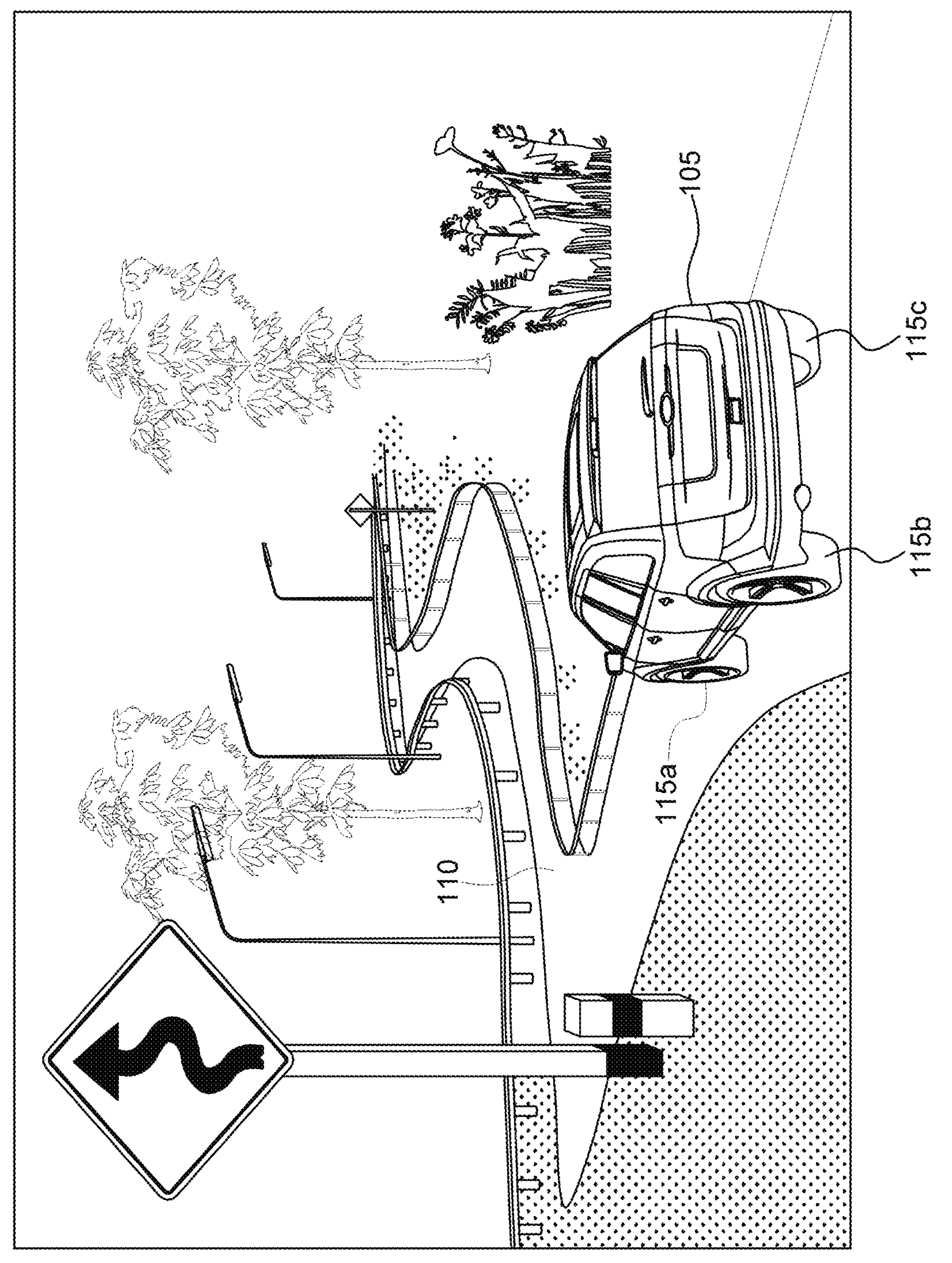
FIG. 1 depicts a first example environment in which techniques and structures for providing the systems and methods disclosed herein may be implemented.

The present disclosure describes a vehicle movement management system ("system") that facilitates movement of a vehicle in a plurality of directions, e.g., reverse direction, lateral sideways direction, and/or the like. The vehicle may be an electric vehicle (EV) having independent wheel drive motors and steering actuators for each vehicle wheel, which may enable each wheel to move independently and facilitate vehicle movement in any direction.

In some aspects, the vehicle may include a first sitting area and a second sitting area that may be configured to swivel or rotate (which terms are used interchangeably herein) about respective sitting area axis. The system may determine an optimum sitting area orientation of the first sitting area and/or the second sitting area based on the direction of vehicle movement. For example, when the vehicle may be moving in the reverse direction, the system may determine that the sitting area orientation of the first sitting area/second sitting area may be towards vehicle's rear portion so that the first sitting area/second sitting area may face towards the direction of vehicle movement. In this manner, when a vehicle operator may be sitting on the first sitting area or the second sitting area when the vehicle may be moving in the reverse direction, the vehicle operator may face the direction of vehicle movement. In some aspects, the system may be further configured select a sitting area from the first sitting area and the second sitting area to implement the optimum sitting area orientation based on the direction of vehicle movement, to enable the vehicle operator to conveniently drive the vehicle in the desired direction.

In further aspects, the system may automatically swivel the selected sitting area to the optimum sitting area orientation, responsive to determining the optimum sitting area orientation and selecting the sitting area. The system may additionally obtain user inputs to maneuver vehicle movement in the desired direction responsive to swiveling the selected sitting area to the optimum sitting area orientation. In some aspects, the system may obtain the user inputs when the system determines that the vehicle operator may be sitting in the selected sitting area. The system may obtain the user inputs from a user device, e.g., a mobile phone. In other aspects, the user inputs may be in the form of hand gestures, and the system may obtain the user inputs in this case based on video feed/images received from a vehicle interior camera.

The systems and methods described herein provide various advantages. For example, the system facilitates maneuvering of a vehicle (e.g., in reverse or sideways direction) in tight spaces such as narrow roads, tight parking spaces, vehicle ferry, and/or the like. Since the system enables the vehicle operator to sit in an orientation that may be aligned with the direction of vehicle movement, the vehicle operator may get better driving experience, and may also prevent adverse situations (as the vehicle operators are generally accustomed to driving in forward direction). Specifically, the system implements reverse drive and sideways drive modes while providing perception to the vehicle operator that the vehicle is actually moving forward. The system also enhances field of view of the vehicle operator in reverse and sideways vehicle movement, thereby providing better driving experience.

The other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts a first example environment 100 in which techniques and structures for providing the systems and methods disclosed herein may be implemented. The environment 100 that may include a vehicle 105 that may be travelling on a narrow road 110 (or a tight space). For example, the vehicle 105 may be travelling on a narrow road in a mountain trail. While describing FIG. 1, references will be made to FIG. 3 that depicts an example orientation of one or more vehicle sitting areas.

The vehicle 105 may be a Battery Electric Vehicle (BEV). The vehicle 105 may take the form of any passenger or commercial vehicle such as, for example, an off-road vehicle, a car, a crossover vehicle, a van, a minivan, a bus, a truck, etc. Further, the vehicle 105 may be a manually driven vehicle and/or may be configured to operate in partially autonomous mode.

The vehicle 105 may have wheels 115*a*, 115*b*, 115*c* (collectively referred as wheels 115) and a fourth wheel (not shown). The wheels 115 may include a driver front side wheel, a driver rear side wheel, a passenger front side wheel, and a passenger rear side wheel. The vehicle 105 may be configured to independently control movement of each wheel 115. In particular, each wheel 115 may have its own independent drive motor and steering actuator that may enable the vehicle 105 to independently control torque, torque polarity, and wheel rotation angle for each wheel 115. Independent movement control of each wheel 115 may enable a vehicle operator or a vehicle movement management system (shown as vehicle movement management system 408 in FIG. 4) to conveniently move the vehicle 105 in a different directions. For example, independent movement control of each wheel 115 may enable vehicle movement in a forward direction, a reverse direction (or a "first direction") opposite to the forward direction, or lateral sideways direction (or a "second direction") that may be perpendicular to the forward/reverse direction.

Figure 3:
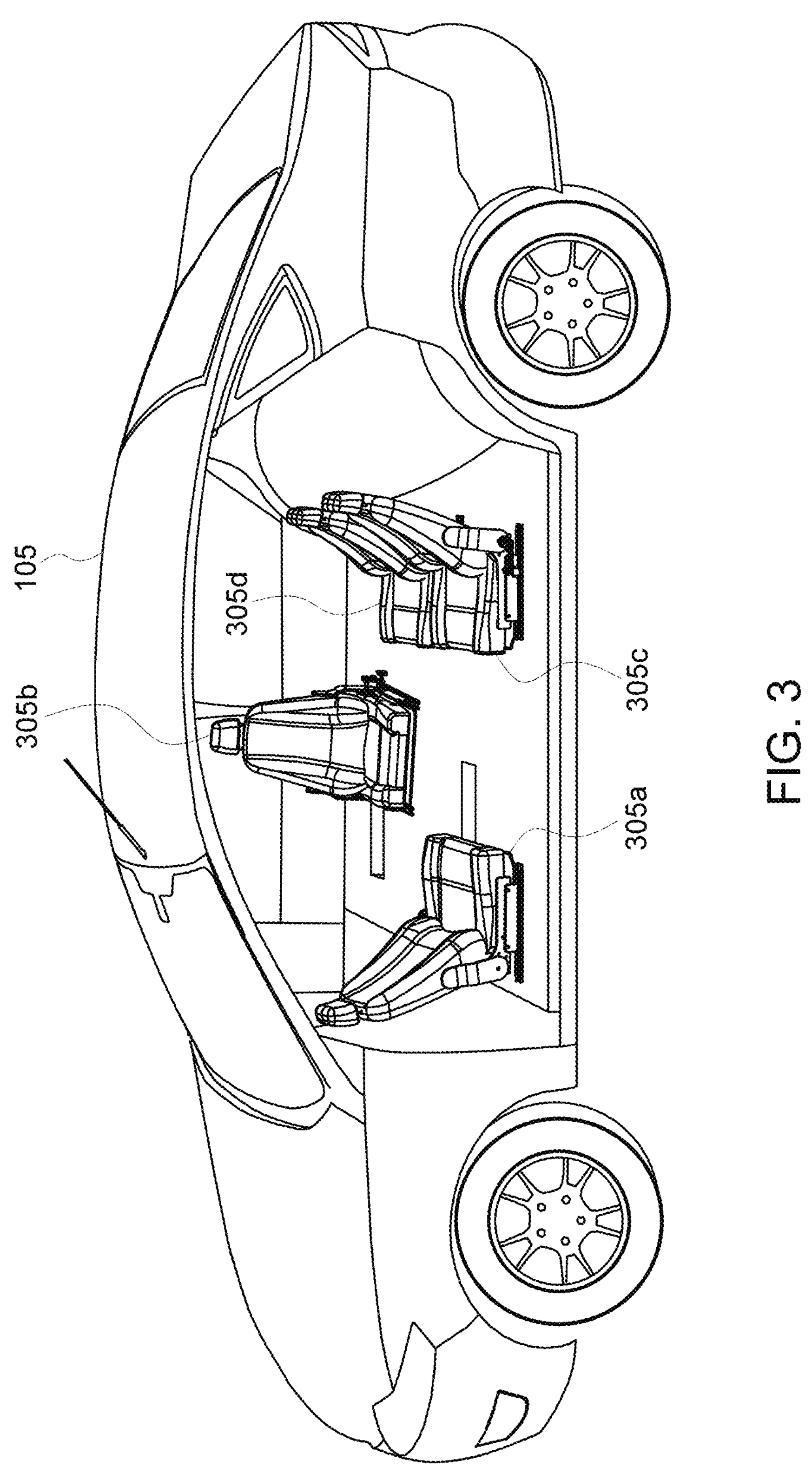
FIG. 3 depicts an example orientation of one or more vehicle sitting areas, in accordance with the present disclosure

The vehicle 105 may further include one or more sitting areas for the vehicle operator and other passengers. For example, the vehicle 105 may include a driver front side sitting area 305*a*, a passenger front side sitting area 305*b*, a driver rear side sitting area 305*c*, and a passenger rear side sitting area 305*d*, as shown in FIG. 3. In some aspects, the driver front side sitting area 305*a* and the passenger front side sitting area 305*b* may be configured to swivel about respective sitting area axis. Stated another way, the driver front side sitting area 305*a* and the passenger front side sitting area 305*b* may be configured to rotate about respective sitting area axis (e.g., rotate 90, 180, 270 or 360 degrees relative to a default front facing siting area position).

In further aspects, the driver rear side sitting area 305*c* and the passenger rear side sitting area 305*d* may also be configured to swivel about respective sitting area axis. In alternative aspects, the driver rear side sitting area 305*c* and/or the passenger rear side sitting area 305*d* may not be configured to swivel about respective sitting area axis. In this case, the driver rear side sitting area 305*c* and/or the passenger rear side sitting area 305*d* may be "stationary" sitting areas, which may face a vehicle front portion direction. In additional aspects, one or more of the driver front side sitting area 305*a*, the passenger front side sitting area 305*b*, the driver rear side sitting area 305*c*, and the passenger rear side sitting area 305*d* may be configured to fold or close (e.g., a sitting area back portion may be folded onto a sitting area bottom/base portion).

In some aspects, the vehicle operator and/or the vehicle movement management system may swivel/orient and/or fold one or more sitting areas based on a vehicle movement direction. For example, the vehicle operator and/or the vehicle movement management system may swivel/rotate (and then lock) the driver front side sitting area 305*a* 180 degrees relative to the default front facing siting area position when the vehicle 105 may be moving in the reverse direction (so that the vehicle operator may face the same direction as the vehicle movement direction). In addition, in this case, the vehicle operator and/or the vehicle movement management system may fold the driver rear side sitting area 305*c*, so that the vehicle operator may have a clear field of view when the vehicle 105 may be travelling in the reverse direction (and the vehicle operator may be sitting in the driver front side sitting area 305*a* that may be rotated 180 degrees relative to its default position).

As another example, the vehicle operator and/or the vehicle movement management system may swivel/rotate (and then lock) the driver rear side sitting area 305*c* 180 degrees (if the driver rear side sitting area 305*c* is configured to swivel/rotate) when the vehicle 105 may be moving in the reverse direction. In this case, the vehicle operator may relocate to the driver rear side sitting area 305*c* (e.g., from the driver front side sitting area 305*a*) when the driver rear side sitting area 305*c* may be rotated 180 degrees relative to its default position.

As yet another example, the vehicle operator and/or the vehicle movement management system may swivel/rotate (and then lock) the driver front side sitting area 305*a* 90 degrees relative to its default position when the vehicle 105 may be moving in the lateral sideways direction.

In some aspects, the vehicle movement management system ("system") may be located in the vehicle 105 (e.g., as part of on-board vehicle computer) and may be configured to provide assistance to the vehicle operator to conveniently move the vehicle 105 in a direction desired by the vehicle operator (e.g., the first direction, which may be the reverse direction or the lateral sideways direction). In an exemplary aspect, to provide assistance to the vehicle operator, the system may enable one or more sitting areas to automatically swivel/rotate relative to their default front facing positions or fold/close so that the vehicle operator may face the direction of vehicle movement (i.e., the first direction).

Figure 2:
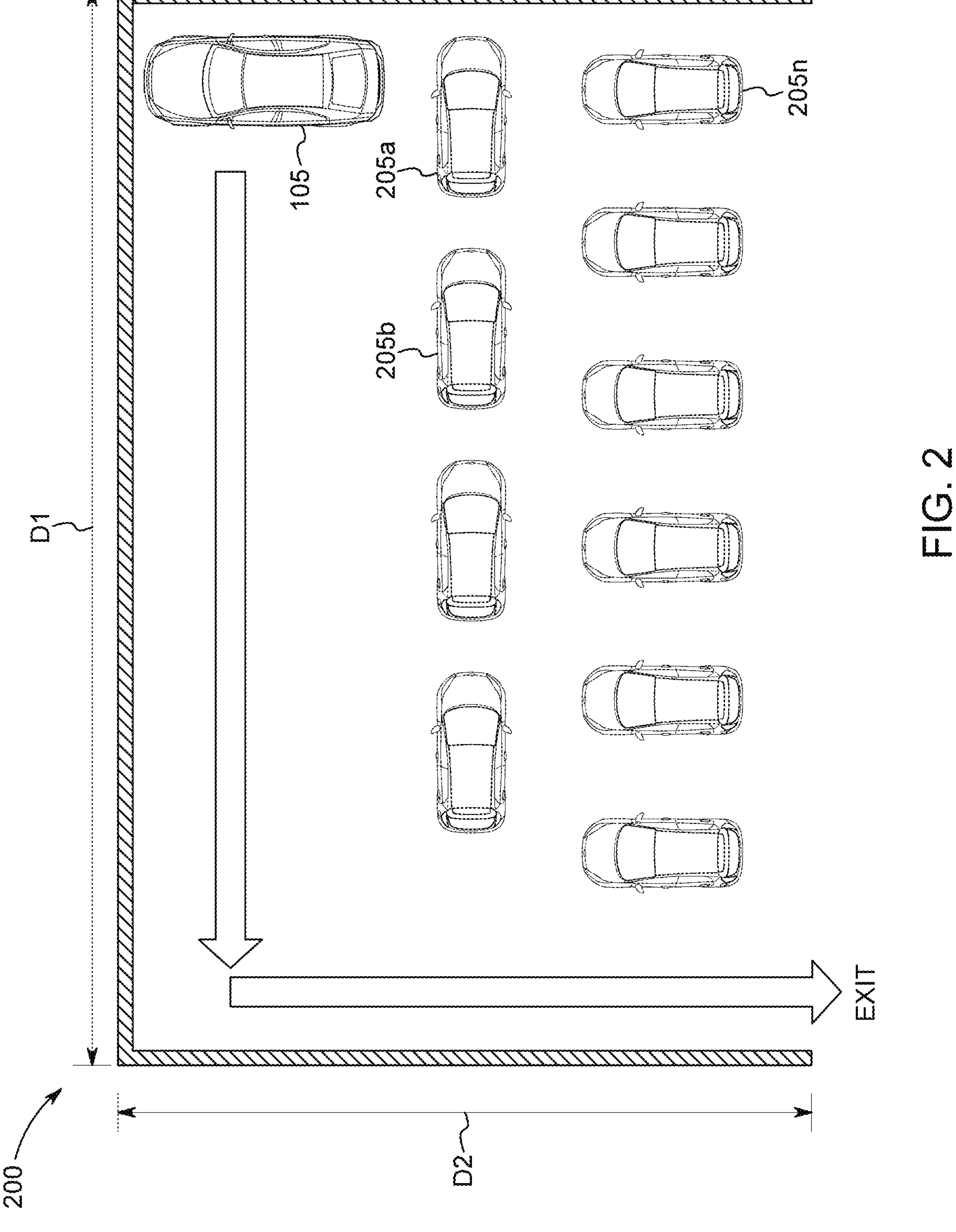
FIG. 2 depicts a second example environment in which techniques and structures for providing the systems and methods disclosed herein may be implemented.

In some aspects, the system may be configured to obtain a user request to activate a first direction drive mode, of a plurality of direction drive modes, associated with the vehicle 105 to move the vehicle 105 in the first direction (e.g., the reverse direction or the lateral sideways direction). The plurality of direction drive modes may be associated with different directions of vehicle movement/travel. As an example, the vehicle operator may transmit a user request to activate the first direction drive mode when the vehicle operator desires to move the vehicle 105 in the reverse direction (or the first direction) for an extended time duration, when the vehicle 105 may be travelling on the narrow road 110 and making a turn may not be possible. As another example, the vehicle operator may transmit a user request to activate the first direction drive mode when the vehicle operator desires to move the vehicle 105 in the lateral sideways direction (or the first direction), when the vehicle 105 may be located in a packaged parking lot and forward/reverse vehicle movement may not be possible (as shown in FIG. 2 and described later in the description below). In some aspects, the user request may indicate the intended or desired direction of vehicle movement/travel (e.g., reverse or sideways).

The vehicle operator may transmit the user request to the system via a user interface. The user interface may be associated with a vehicle Human-Machine Interface (HMI) or a vehicle infotainment system screen. Alternatively, the user interface may be associated with a user device that may include, but is not limited to, a mobile phone, a laptop, a tablet, a wearable device, and/or the like.

The system may obtain the user request from the user interface to activate the first direction drive mode of the vehicle 105. Responsive to obtaining the user request, the system may determine an optimum sitting area orientation of one or more sitting areas based on the user request (specifically based on the direction of vehicle movement). Responsive to determining the optimum sitting area orientation, the system may select/determine a sitting area (from the sitting areas described above) to swivel and/or fold based on the determined optimum sitting area orientation, so that the vehicle operator may conveniently drive the vehicle 105 in the first direction. In some aspects, the system may select the sitting area based on degrees of freedom of movement associated with each sitting area and the first direction. For example, when the vehicle operator requests to drive the vehicle 105 in the reverse direction, the system may determine whether the driver front side sitting area 305*a* or the driver rear side sitting area 305*c* may be rotated 180 degrees (clockwise or counterclockwise) based on whether the driver rear side sitting area 305*c* is rotatable or stationary. When the system determines that the driver rear side sitting area 305*c* may be rotatable, the system may select the driver rear side sitting area 305*c* to swivel. On the other hand, when the system determines that the driver rear side sitting area 305*c* may be stationary (i.e., may not be configured to swivel), the system may select the driver front side sitting area 305*a* to swivel and the driver rear side sitting area 305*c* to fold.

Responsive to selecting the sitting area(s) to swivel or fold and respective optimum sitting area orientation, the system may determine a current sitting area orientation of the selected sitting area(s). The system may then compare the current sitting area orientation with the optimum sitting area orientation. Responsive to determining that the current sitting area orientation may be different from the optimum sitting area orientation, the system may transmit a notification to the user interface indicating the selected sitting area and the determined optimum sitting area orientation. The notification may include instructions to use or move the selected sitting area in the sitting area orientation. For example, the instruction may include steps for rotating the driver front side sitting area 305*a* 180 degrees relative to its default front facing position. As another example, the instruction may include request for vehicle operator to sit on the driver rear side sitting area 305*c* and rotate the driver rear side sitting area 405*c* 180 degrees relative to its default front facing position.

In additional aspects, responsive to determining that the current sitting area orientation may be different from the optimum sitting area orientation, the system may automatically swivel/rotate and/or fold the selected sitting area(s) based on the determined optimum sitting area orientation.

When the selected sitting area(s) may be positioned in the determined optimum sitting area orientation and/or when the vehicle operator may be sitting on the selected sitting area in the optimum sitting area orientation, the system may determine/obtain user inputs to maneuver vehicle movement in the first direction. In some aspects, the system may obtain the user inputs to steer the vehicle movement in the first direction. For example, the system may obtain user hand gestures using vehicle interior camera to determine the user inputs to maneuver vehicle movement in the first direction. Alternatively, the system may obtain the user inputs from the user device. Responsive to obtaining the user inputs, the system may cause the vehicle 105 to move in the first direction based on the user inputs. Further details of the system are described later below in conjunction with FIG. 4.

The vehicle 105, the system and the vehicle operator implement and/or perform operations, as described here in the present disclosure, in accordance with the owner manual and safety guidelines. In addition, any action taken by the vehicle operator based on recommendations or notifications provided by the vehicle 105 and/or the system should comply with all the rules specific to the location and operation of the vehicle 105 (e.g., Federal, state, country, city, etc.). The recommendation or notifications, as provided by the vehicle 105 and/or the system should be treated as suggestions and only followed according to any rules specific to the location and operation of vehicle 105.

FIG. 2 depicts a second example environment 200 in which techniques and structures for providing the systems and methods disclosed herein may be implemented. The environment 200 may include a parking facility in which the vehicle 105 may be parked, along with other vehicles 205*a*, 205*b*, 205*n* (collectively referred as other vehicles 205). The vehicle 105 may be parked in a location that may prevent forward or reverse vehicle movement (e.g., due to parking of the other vehicles 205 in the parking facility). In such a scenario, the vehicle operator may transmit a user request to the system to activate the first direction drive mode such the vehicle 105 may move in a lateral sideways direction (e.g., left sideways direction as the right sideways movement is obstructed due to a parking facility wall, as shown in FIG. 2).

The system may receive the user request to activate the lateral sideways movement, and may determine a sitting area orientation of one or more sitting areas based on the user request, as described above. For example, when the vehicle operator requests to drive the vehicle 105 in the left sideways direction, the system may determine that the driver front side sitting area 305*a* may be rotated 90 degrees counterclockwise relative to its default front facing position, to enable the vehicle operator to conveniently drive/move the vehicle 105 in the left sideways direction. Alternatively, when leg room may be limited, the system may request the vehicle operator to use the passenger front side sitting area 305*b* and rotate it counterclockwise (or the system may automatically rotate the passenger front side sitting area 305*b* counterclockwise) to enable vehicle movement in the left sideways direction.

The system may additionally transmit a notification indicating the selected sitting area and the optimum sitting area orientation. The system may further obtain the user inputs when the vehicle operator may be sitting on the selected sitting area in the optimum sitting area orientation, and may cause the vehicle movement based on the user inputs as described above. For example, the vehicle operator may transmit, via the user device or via hand gesture, a first user input indicating the vehicle 105 to travel a distance "D1" towards the left direction. Thereafter, the vehicle operator may transmit a second user input indicating the vehicle 105 to travel a distance "D2" in reverse direction, to enable the vehicle 105 to conveniently exit the parking facility.

Figure 4:
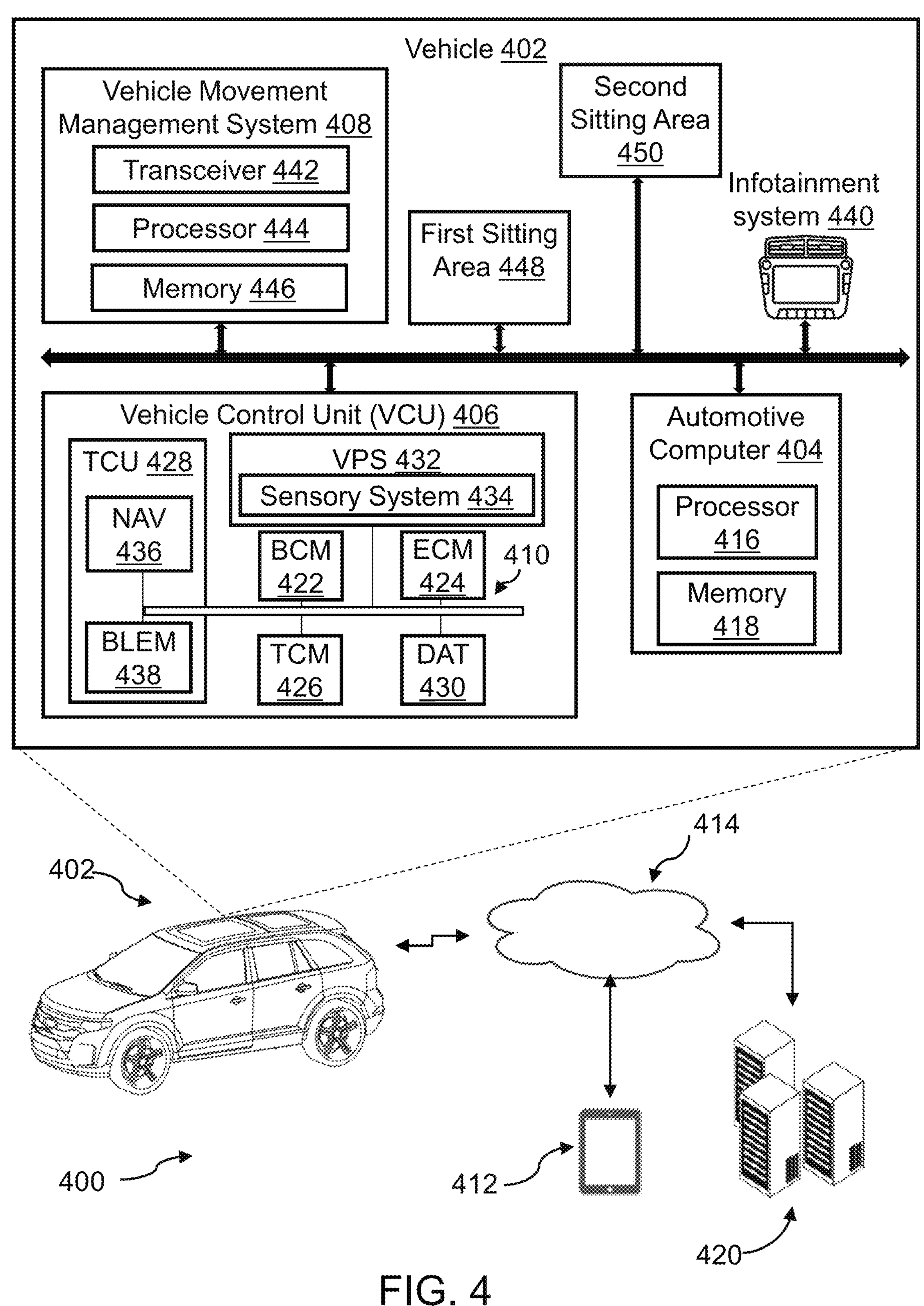
FIG. 4 depicts a block diagram of an example system for managing vehicle movement, in accordance with the present disclosure.

FIG. 4 illustrates a block diagram of an example system 400 for managing vehicle movement, in accordance with the present disclosure. FIG. 4 will be described in conjunction with FIGS. 5, 6A and 6B.

The system 400 may include a vehicle 402, which may be same as the vehicle 105 described above in conjunction with FIGS. 1 and 2. The vehicle 402 may include an automotive computer 404, a Vehicle Control Unit (VCU) 406, and a vehicle movement management system 408 (same as the vehicle movement management system described above in conjunction with FIG. 1). The VCU 406 may include a plurality of Electronic Control Units (ECUs) 410 disposed in communication with the automotive computer 404.

The system 400 may further include a mobile device 412 (or a user device) that may connect with the automotive computer 404 and/or the vehicle movement management system 408 by using wired and/or wireless communication protocols and transceivers. In some aspects, the mobile device 412 may be associated with a vehicle user/operator (not shown). The mobile device 412 may communicatively couple with the vehicle 402 via one or more network(s) 414, which may communicate via one or more wireless connection(s), and/or may connect with the vehicle 402 directly by using near field communication (NFC) protocols, Bluetooth® protocols, Wi-Fi, Ultra-Wideband (UWB), and other possible data connection and sharing techniques.

The network(s) 414 illustrates an example communication infrastructure in which the connected devices discussed in various embodiments of this disclosure may communicate. The network(s) 414 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11. UWB, and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

In some aspects, the automotive computer 404 and/or the vehicle movement management system 408 may be installed anywhere in the vehicle 402. Further, the automotive computer 404 may operate as a functional part of the vehicle movement management system 408. The automotive computer 404 may be or include an electronic vehicle controller, having one or more processor(s) 416 and a memory 418. Moreover, the vehicle movement management system 408 may be separate from the automotive computer 404 (as shown in FIG. 4) or may be integrated as part of the automotive computer 404.

The processor(s) 416 may be disposed in communication with one or more memory devices disposed in communication with the respective computing systems (e.g., the memory 418 and/or one or more external databases not shown in FIG. 4). The processor(s) 416 may utilize the memory 418 to store programs in code and/or to store data for performing aspects in accordance with the disclosure. The memory 418 may be a non-transitory computer-readable medium or memory storing a vehicle movement management program code. The memory 418 may include any one or a combination of volatile memory elements (e.g., dynamic random-access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.).

In some aspects, the automotive computer 404 and/or the vehicle movement management system 408 may be disposed in communication with one or more server(s) 420 and the mobile device 412 via the network(s) 414. In some aspects, the server(s) 420 may be part of a cloud-based computing infrastructure and may be associated with and/or include a Telematics Service Delivery Network (SDN) that provides digital data services to the vehicle 402 and other vehicles (not shown in FIG. 4) that may be part of a vehicle fleet. In further aspects, the server 420 may be configured to store a mapping of a plurality of sitting area orientations (e.g., in respective direction drive modes) with maximum permissible vehicle speeds and/or vehicle steering or rotation rates. For example, the server 420 may store information associated with the maximum permissible vehicle speed when the vehicle 402 may be travelling in the reverse direction and the driver front side sitting area 305*a* may be swiveled/rotated 180 degrees relative to the default sitting area front facing position. The server 420 may be configured to transmit the mapping to the vehicle 402 at a predefined frequency, or when the vehicle 402 transmits a request to the server 420 for obtaining the mapping.

In accordance with some aspects, the VCU 406 may share a power bus with the automotive computer 404, and may be configured and/or programmed to coordinate the data between vehicle systems, connected servers (e.g., the server(s) 420), and other vehicles (not shown in FIG. 4) operating as part of a vehicle fleet. The VCU 406 can include or communicate with any combination of the ECUs 410, such as, for example, a Body Control Module (BCM) 422, an Engine Control Module (ECM) 424, a Transmission Control Module (TCM) 426, a telematics control unit (TCU) 428, a Driver Assistances Technologies (DAT) controller 430, etc. The VCU 406 may further include and/or communicate with a Vehicle Perception System (VPS) 432, having connectivity with and/or control of one or more vehicle sensory system(s) 434. The vehicle sensory system 434 may include one or more vehicle sensors including, but not limited to, a Radio Detection and Ranging (RADAR or "radar") sensor configured for detection and localization of objects inside and outside the vehicle 402 using radio waves, sitting area buckle sensors, sitting area sensors, a Light Detecting and Ranging (LiDAR or "lidar") sensor, door sensors, proximity sensors, temperature sensors, wheel sensors, etc. In addition, the vehicle sensory system 434 may include vehicle interior cameras configured to capture user inputs to maneuver vehicle movement. For example, the vehicle interior cameras may capture user gestures to maneuver vehicle movement.

In some aspects, the VCU 406 may control vehicle operational aspects and implement one or more instruction sets received from the mobile device 412, from one or more instruction sets stored in computer memory 418, including instructions operational as part of the vehicle movement management system 408.

The TCU 428 may be configured and/or programmed to provide vehicle connectivity to wireless computing systems onboard and off board the vehicle 402, and may include a Navigation (NAV) receiver 436 for receiving and processing a GPS signal, a BLE® Module (BLEM) 438 or BUN (BLE, UWB, NFC module), a Wi-Fi transceiver, a Ultra-Wideband (UWB) transceiver, and/or other wireless transceivers (not shown in FIG. 4) that may be configurable for wireless communication between the vehicle 402 and other systems (e.g., a vehicle key fob, not shown in FIG. 4), computers, and modules. The TCU 428 may be disposed in communication with the ECUs 410 by way of a bus.

In one aspect, the ECUs 410 may control aspects of vehicle operation and communication using inputs from human drivers, inputs from an autonomous vehicle controller, the vehicle movement management system 408, and/or via wireless signal inputs received via the wireless connection(s) from other connected devices, such as the mobile device 412, the server(s) 420, among others. In some aspects, the ECUs 410 may be configured to control drive motor and steering actuator of each wheel 115*a*-115*d*, and thus control independent movement of each wheel 115*a*-115*d* based on instructions provided by the vehicle movement management system 408.

The BCM 422 generally includes integration of sensors, vehicle performance indicators, and variable reactors associated with vehicle systems, and may include processor-based power distribution circuitry that may control functions associated with the vehicle body such as lights, windows, security, camera(s), audio system(s), speakers, door locks, sitting area movement, and access control, vehicle energy management, and various comfort controls. The BCM 422 may also operate as a gateway for bus and network interfaces to interact with remote ECUs (not shown in FIG. 4). In some aspects, the BCM 422 may be configured to control or activate swiveling movement and/or folding movement of the sitting areas 305*a-d*, as described below. For example, BCM 422 may automatically swivel/rotate the driver front side sitting area 305*a* based on command signals obtained from the vehicle movement management system 408.

In some aspects, the DAT controller 430 may provide Level-1 through Level-3 automated driving and driver assistance functionality that may include, for example, active parking assistance, trailer backup assistance, adaptive cruise control, and/or driver status monitoring, among other features.

In some aspects, the automotive computer 404 may connect with an infotainment system 440 that may include a touchscreen interface portion, and may include voice recognition features, biometric identification capabilities that can identify users based on facial recognition, voice recognition, fingerprint identification, or other biological identification means. In other aspects, the infotainment system 440 may be further configured to receive user instructions via the touchscreen interface portion, and/or display notifications, navigation maps, etc. on the touchscreen interface portion. For example, the infotainment system 440 may receive the user request to move the vehicle 402 in the first direction (e.g., reverse direction or lateral sideways direction), as described above in conjunction with FIG. 1.

The computing system architecture of the automotive computer 404, the VCU 406, and/or the vehicle movement management system 408 may omit certain computing modules. It should be readily understood that the computing environment depicted in FIG. 4 is an example of a possible implementation according to the present disclosure, and thus, it should not be considered limiting or exclusive.

In accordance with some aspects, the vehicle movement management system 408 may be integrated with and/or executed as part of the ECUs 410. The vehicle movement management system 408, regardless of whether it is integrated with the automotive computer 404 or the ECUs 410, or whether it operates as an independent computing system in the vehicle 402, may include a transceiver 442, a processor 444, and a computer-readable memory 446. The transceiver 442 may be configured to receive information/inputs from external devices or systems, e.g., the mobile device 412, the server 420, and/or the like. Further, the transceiver 442 may transmit notifications (e.g., alert/alarm signals) to the external devices or systems. In addition, the transceiver 442 may be configured to receive information/inputs from vehicle components such as the infotainment system 440, the vehicle sensory system 434, and/or the like. For example, the transceiver 442 may receive the user request via the infotainment system 440 (or the mobile device 412) to activate a first direction mode of the vehicle 402 to move the vehicle 402 in the first direction (e.g., the reverse direction or lateral sideways direction). Stated another way, the transceiver 442 may be configured to receive the user request to move the vehicle 402 in the first direction. Further, the transceiver 442 may transmit notifications (e.g., alert/alarm signals) to the vehicle components such as the infotainment system 440.

The processor 444 and the memory 446 may be same as or similar to the processor 416 and the memory 418, respectively. Specifically, the processor 444 may utilize the memory 446 to store programs in code and/or to store data for performing aspects in accordance with the disclosure. The memory 446 may be a non-transitory computer-readable medium or memory storing the vehicle movement management program code.

In addition to the components described above, the vehicle 402 may include a first sitting area 448 and a second sitting area 450. The first sitting area 448 and the second sitting area 450 may be same as one of the driver front side sitting area 305*a*, the passenger front side sitting area 305*b*, the driver rear side sitting area 305*c* and the passenger rear side sitting area 305*d* depicted in FIG. 3 and described above. In some aspects, the first sitting area 448 and the second sitting area 450 may be configured to swivel about a first sitting area axis and a second sitting area axis, respectively.

In operation, the processor 444 may obtain the user request to move the vehicle 402 in the first direction via the transceiver 442. For example, the user may transmit the user request, via the mobile device 412 or the infotainment system 440, to the transceiver 442 to move the vehicle 402 in the reverse direction or lateral sideways direction. In some aspects, the user request may include the first direction. Responsive to obtaining the user request, the processor 444 may determine an optimum sitting area orientation for a sitting area (e.g., the first sitting area 448 and/or the second sitting area 450) based on the first direction. For example, when the first direction may be the lateral sideways direction (perpendicular to a forward direction) and towards a passenger direction (or right side direction), the processor 444 may determine that the optimum sitting area orientation of the sitting area may be towards the passenger's direction such that the sitting area may face a vehicle's right side portion and towards the direction of vehicle movement, as depicted in view 502 of FIG. 5.

Figure 5:
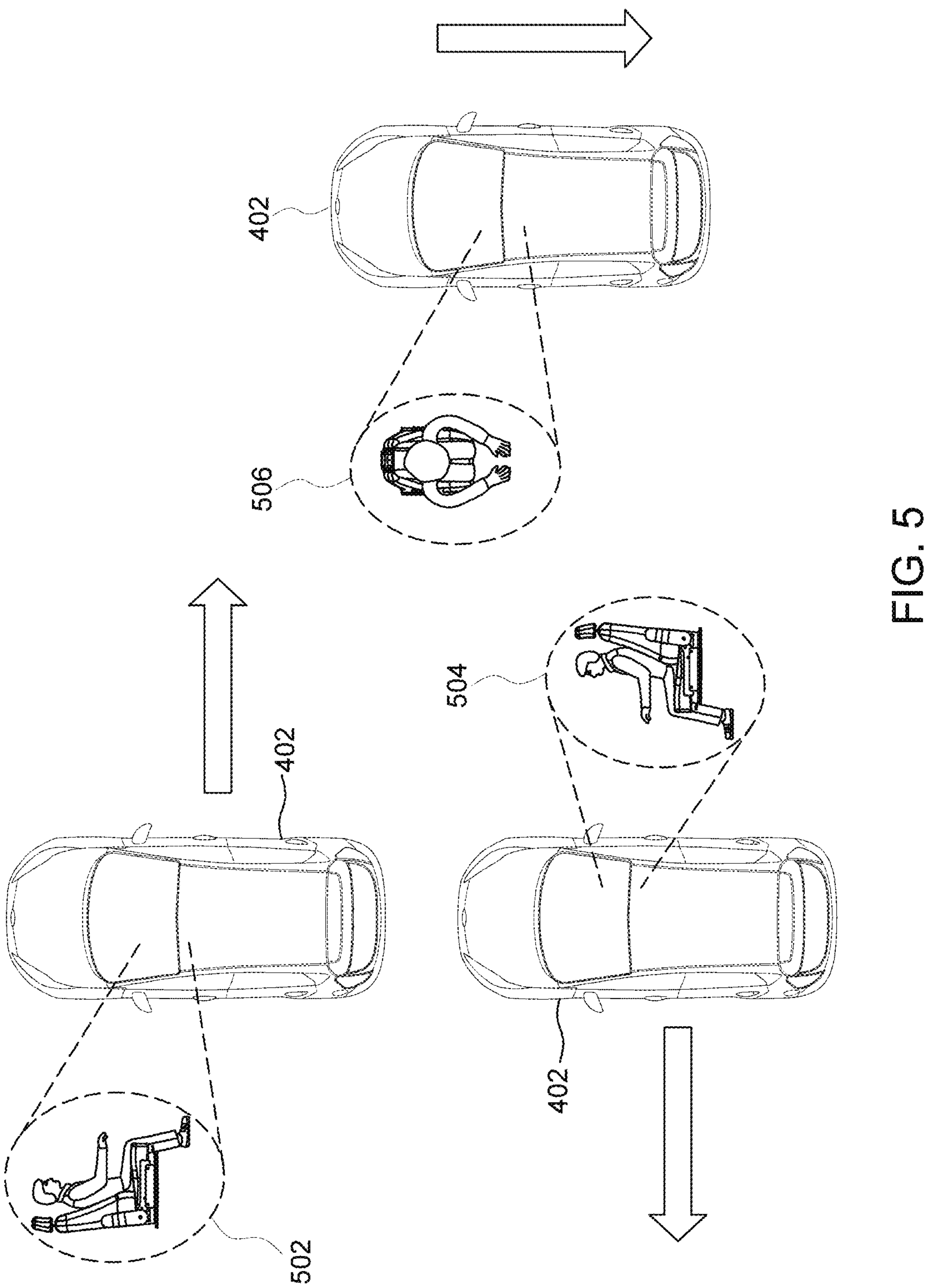
FIG. 5 depicts example sitting area orientations based on vehicle movement direction, in accordance with the present disclosure.
Figure 6A:
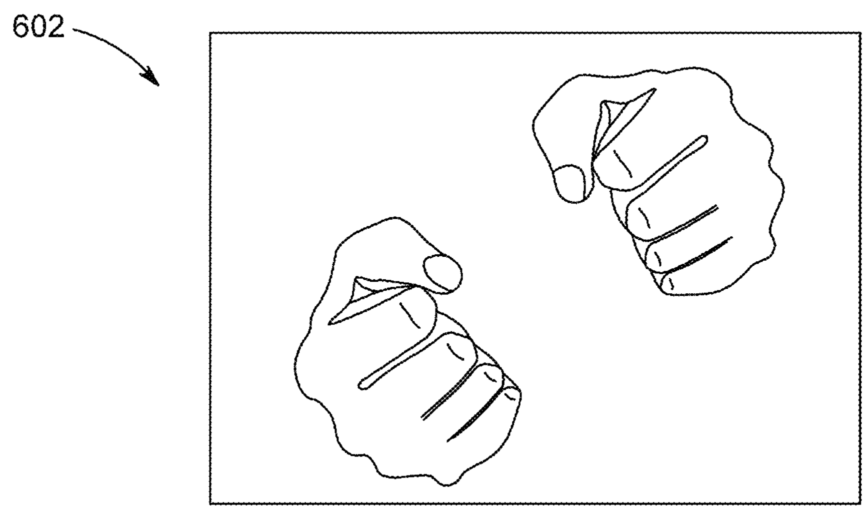
FIGS. 6A-6B depict example user inputs to control vehicle movement, in accordance with the present disclosure.
Figure 6B:
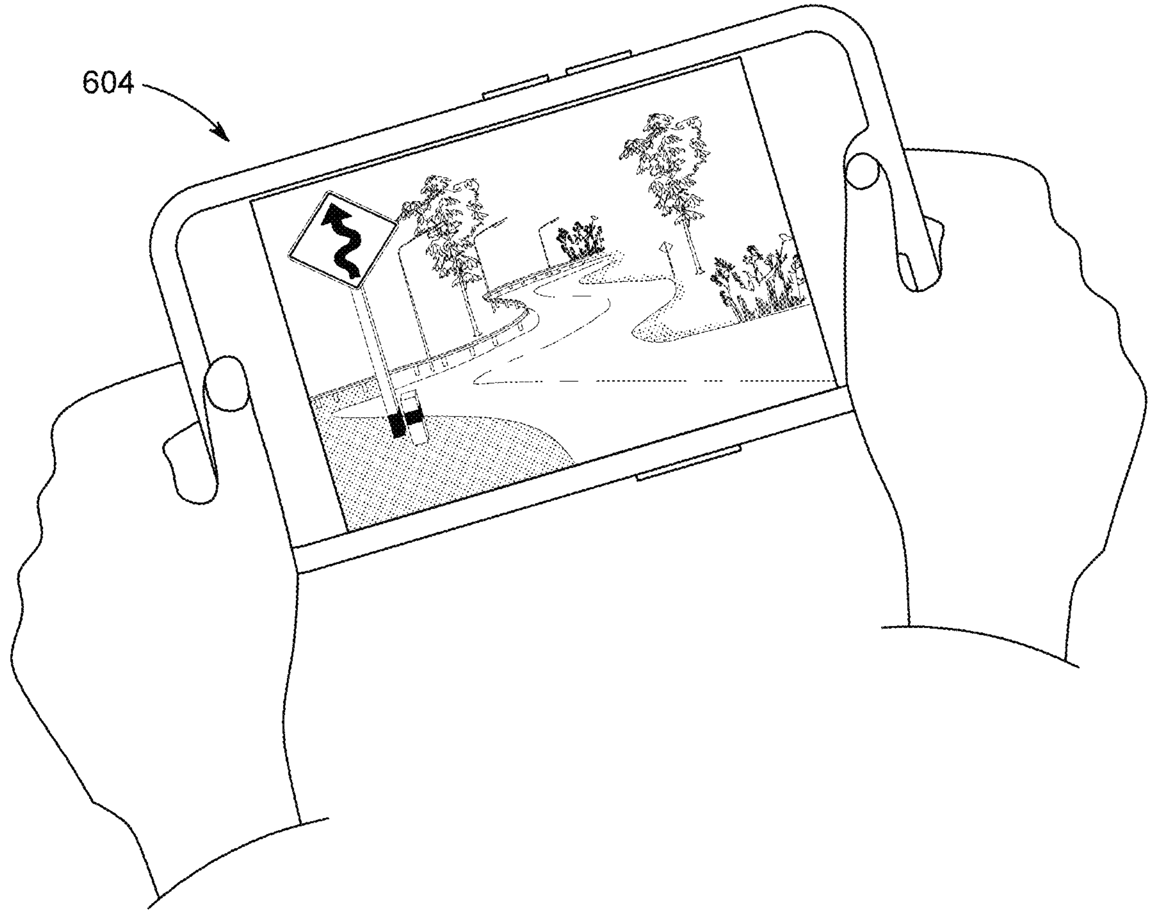

In another scenario, when the first direction may be the lateral sideways direction and towards a driver direction (or left side direction), the processor 444 may determine that the optimum sitting area orientation of the sitting area may be towards the driver's direction such that the sitting area may face a vehicle's left side portion and towards the direction of vehicle movement, as depicted in view 504 of FIG. 5. On the other hand, when the first direction may be the reverse direction (opposite to the forward direction), the processor 444 may determine that the optimum sitting area orientation of the sitting area may be towards vehicle's rear portion such that the sitting area may face a vehicle rear portion and towards the direction of vehicle movement, as depicted in view 506 of FIG. 5.

In addition, responsive to obtaining the user request and/or determining the optimum sitting area orientation, the processor 444 may select the sitting area from the first sitting area 448 and the second sitting area 450 to execute/implement the optimum sitting area orientation based on the user request (i.e., the first direction). For example, when the first sitting area 448 may be the driver front side sitting area 305*a* and the second sitting area 450 may be the driver rear side sitting area 305*c* and the vehicle operator requests to move the vehicle 402 in the reverse direction, the processor 444 may select the second sitting area 450 to implement the determined optimum sitting area orientation (as the second sitting area 450 may provide better field of view to the vehicle operator when the vehicle 402 may be moving in the reverse direction).

Responsive to selecting the second sitting area 450, the processor 444 may determine whether the second sitting area 450 may be rotatable by 180 degrees about its sitting area axis. Stated another way, responsive to selecting the second sitting area 550, the processor 444 may determine whether the second sitting area 450 is rotatable or a stationary sitting area. In the latter case, the second sitting area 450 may not be configured to rotate, but may be configured to fold or close. Responsive to a determination that the second sitting area 450 may be rotatable (or may be rotated by 180 degrees), the processor 444 may confirm selection of the second sitting area 450. On the other hand, responsive to a determination that the second sitting area 450 may not be rotatable, the processor 444 may not confirm selection of the second sitting area 450. In this case, the processor 444 may then select the first sitting area 448 to implement the determined optimum sitting area orientation.

Similarly, when the first sitting area 448 may be the driver front side sitting area 305*a* and the second sitting area 450 may be the passenger front side sitting area 305*b* and the vehicle operator requests to move the vehicle 402 in the lateral sideways direction towards the driver's side, the processor 444 may select the first sitting area 448 to implement the determined optimum sitting area orientation (as the first sitting area 448 may provide better field of view to the vehicle operator when the vehicle 402 may be moving in the lateral sideways direction towards the driver's side). In a scenario where the leg room for the first sitting area 448 may be limited and may not allow the first sitting area 448 to implement the determined optimum sitting area orientation, the processor 444 may select the second sitting area 450 to implement the determined optimum sitting area orientation.

Responsive to selecting the sitting area and determining the optimum sitting area orientation as described above, the processor 444 may cause (e.g., by sending command signals to the BCM 422) the selected sitting area to swivel/rotate about its sitting area axis to be (and get locked) at the determined optimum sitting area orientation. In some aspects, the processor 444 may cause the selected sitting area to swivel/rotate by automatically swiveling and locking the selected sitting area in the determined optimum sitting area orientation.

In some aspects, before automatically swiveling and locking the selected sitting area in the determined optimum sitting area orientation, the processor 444 may determine a current selected sitting area orientation (e.g., based on inputs obtained by the vehicle sensory system 434) of the selected sitting area, and compare the current selected sitting area orientation with the determined optimum sitting area orientation (e.g., "final sitting area orientation" based on the first direction). The processor 444 may cause the selected sitting area to swivel/rotate to the optimum sitting area orientation when the current selected sitting area orientation may be different from the optimum/final sitting area orientation.

For instance, the processor 444 may determine that the second sitting area 450 may be required to be moved by 180 degrees (i.e., to the optimum sitting area orientation) to enable the vehicle operator to face the direction of vehicle movement when the vehicle 402 may be moving in the reverse direction. Responsive to such determination, the processor 444 may automatically rotate (via the BCM 422) the second sitting area 450 by 180 degrees to enable the second sitting area 450 to face the vehicle rear portion. This may facilitate the vehicle operator to move/drive the vehicle 402 in the reverse direction without any inconvenience, as the vehicle operator may face the same direction as the direction of travel/vehicle movement. In some aspects, when the processor 444 determines that the second sitting area 450 may not be rotatable (or not configured to swivel), the processor 444 may rotate the first sitting area 448 by 180 degrees. In such a scenario, the processor 444 may additionally (and automatically) fold the second sitting area 450 to enhance the field of view of the vehicle operator, responsive to rotating/swiveling the first sitting area 448 by 180 degrees.

In some aspects, responsive to causing the selected sitting area to swivel/rotate to the optimum sitting area orientation, the processor 444 may obtain a user input to maneuver vehicle movement in the first direction, and may cause the vehicle 402 to move in the first direction based on the user input. In an exemplary aspect, the processor 444 may obtain the user input when the vehicle operator may be sitting in the selected sitting area when or after the selected sitting area may be swiveled/rotated to the optimum sitting area orientation. To determine whether the vehicle operator is sitting in the selected sitting area, the processor 444 may obtain inputs from the vehicle sensory system 434 (e.g., sitting area sensors and/or vehicle interior cameras) and confirm vehicle operator's presence on the selected sitting area based on the obtained inputs. Responsive to determining that the vehicle operator may be sitting in the selected sitting area, the processor 444 may obtain the user inputs and transmit an instruction to the VCU 406 to move the vehicle 402 or cause vehicle movement based on the user input.

In some aspects, the user input may be in the form of hand gesture (or gesture associated with any other body part). In this case, the vehicle sensory system 434 (e.g., vehicle interior camera) may be configured to capture the user input and transmit information associated with the user input to the processor 444. Specifically, in this case, the processor 444 may obtain inputs from the vehicle sensory system 434 (e.g., vehicle interior camera) that may capture user/vehicle operator's hand gestures in a vehicle interior portion. The processor 444 may analyze video feed or images of the vehicle operator sitting on the selected sitting area captured by the vehicle sensory system 434, and determine/recognize user inputs (such as hand gestures) based on the analysis of the video feed/images inputs to maneuver the vehicle movement. Stated another way, the processor 444 may obtain hand gestures of the vehicle operator and control vehicle movement based on the hand gestures via the VCU 406, without requiring the vehicle operator to operate the actual vehicle steering wheel and/or pedals. For example, the processor 444 may recognize vehicle operator's hand gestures making virtual action of steering wheel movement (as depicted in view 602 of FIG. 6A) and may monitor hand movement to calculate a steering wheel rotation angle based on the hand movement. Responsive to calculating the steering wheel rotation angle based on the hand movement, the processor 444 may transmit command signals to the DAT controller 430 to accordingly enable vehicle movement (e.g., turn rear vehicle wheels to steer the vehicle 402). Similarly, the processor 444 may recognize a "STOP" hand gesture associated with the vehicle movement when the vehicle operator raises hand perpendicular to the wrist, and recognize a "GO" hand gesture when the vehicle operator raises hand at an acute angle relative to the wrist. In some aspects, the memory 446 may store a list of hand gestures that the vehicle operator may use for different vehicle movements. The processor 444 may use the stored list to enable vehicle movements based on vehicle operator's hand gestures.

In further aspects, the processor 444 may obtain the user input from the mobile device 412. For example, the processor 444 may obtain inputs to "STOP" the vehicle 402, "MOVE" the vehicle 402, "STEER" the vehicle 402, and/or the like, based on orientation (e.g., rotation and turning) of the mobile device 412 relative to vehicle's movement. In some aspect, the processor 444 may obtain mobile device rotation angle relative to a vehicle longitudinal axis, and steer the vehicle 402 based on the mobile device rotation angle, as depicted in view 604 of FIG. 6B. The processor 444 may determine mobile device rotation angle based on inputs obtained from an Inertial Measurement Unit (IMU) included in the mobile device 412 and/or based on inputs obtained from the vehicle sensory system 434 (e.g., the vehicle interior cameras). In further aspects, the processor 444 may obtain the user inputs from dedicated mobile device buttons or actuators (e.g., move or stop buttons).

In additional aspects, while causing/enabling vehicle movement based on the user inputs, the processor 444 may obtain the mapping of the plurality of sitting area orientations (e.g., in respective direction drive modes) with the maximum permissible vehicle speed and/or vehicle steering wheel rotation rate from the server 420 (or the memory 446). Responsive to obtaining the mapping, the processor 444 may be determine the maximum permissible vehicle speed and vehicle steering wheel rotation rate associated with the determined sitting area orientation. The processor 444 may cause/enable vehicle movement based on the determined maximum permissible vehicle speed and/or vehicle steering wheel rotation rate.

Figure 7:
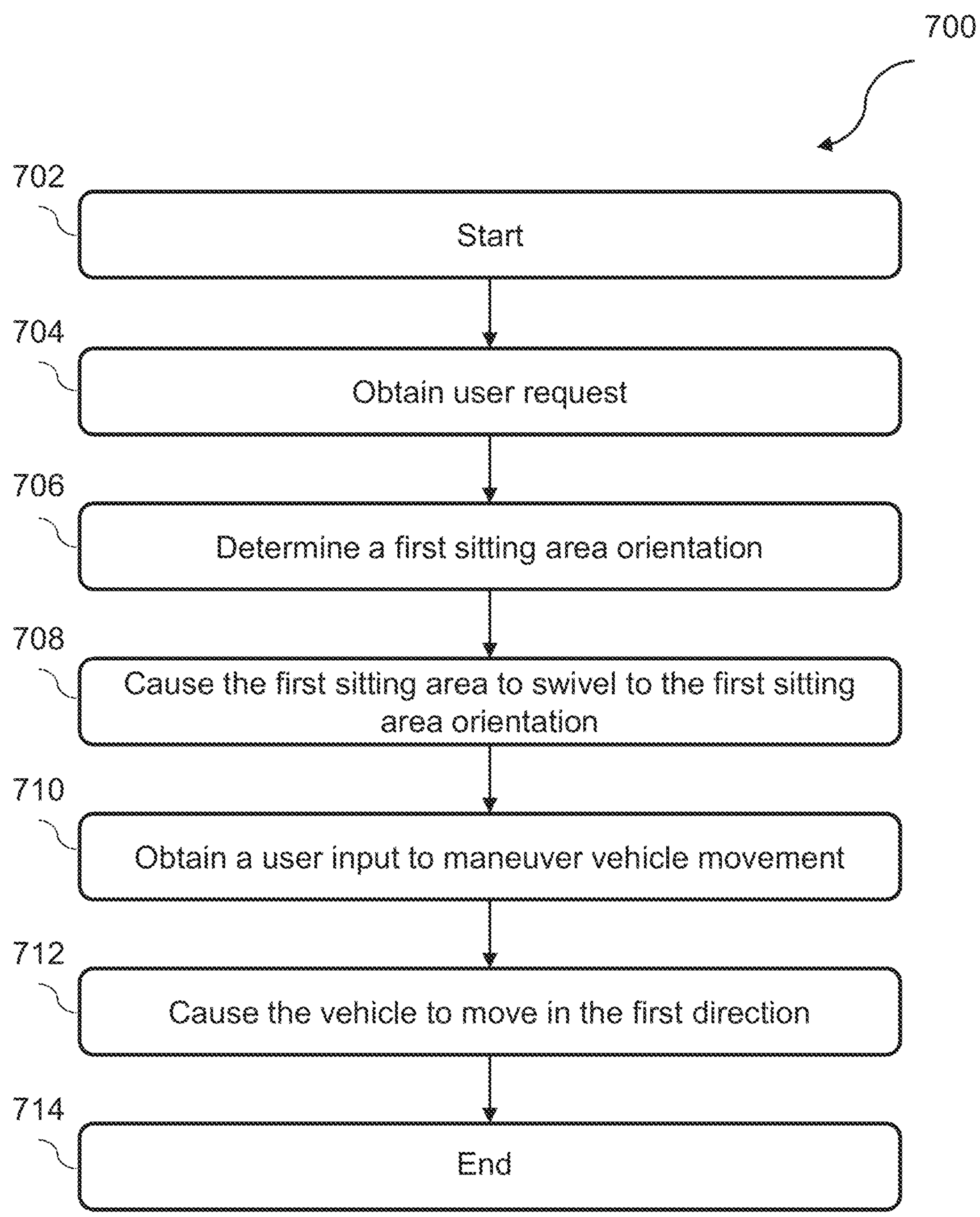
FIG. 7 depicts a flow diagram of an example method for managing vehicle movement, in accordance with the present disclosure.

FIG. 7 depicts a flow diagram of an example method 700 for managing vehicle movement, in accordance with the present disclosure. FIG. 7 may be described with continued reference to prior figures. The following process is exemplary and not confined to the steps described hereafter. Moreover, alternative embodiments may include more or less steps than are shown or described herein and may include these steps in a different order than the order described in the following example embodiments.

Referring to FIG. 7, at step 702, the method 700 may commence. At step 704, the method 700 may include obtaining, by the processor 444, the user request to move the vehicle 402 in the first direction. The first direction may be a reverse/backward direction opposite to a forward direction. Alternatively, the first direction may be lateral sideways direction, perpendicular to the forward direction.

At step 706, the method 700 may include determining, by the processor 444, a first sitting area orientation associated with a first sitting area configured to swivel about a first sitting area axis. The processor 444 may determine the sitting area orientation based on the first direction, and responsive to obtaining the user request.

At step 708, the method 700 may include causing, by the processor 444, the first sitting area to swivel to the first sitting area orientation such that the first sitting area may face the first direction (i.e., the direction of vehicle movement/travel). At step 710, the method 700 may include obtaining, by the processor 444, a user input to maneuver the vehicle movement in the first direction, responsive to causing the first sitting area to swivel to the first sitting area orientation. At step 712, the method 700 may include causing, by the processor 444, the vehicle 402 to move in the first direction based on the user input.

The method 700 may end at step 714.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:
- a first sitting area configured to swivel about a first sitting area axis;
- a second sitting area not configured to swivel;
- a vehicle sensor configured to detect a vehicle operator seated on the first sitting area;
- a transceiver configured to receive a user request to move the vehicle in a first direction; and
- a processor communicatively coupled to the transceiver and the first sitting area, wherein the processor is configured to:
  - obtain the user request;
  - determine a first sitting area orientation based on the first direction, responsive to obtaining the user request;
  - cause the first sitting area to swivel to the first sitting area orientation;
  - cause the second sitting area to fold based on the first direction to enhance a field of view of the vehicle operator from the first sitting area, responsive to causing the first sitting area to swivel to the first sitting area orientation;
  - generate a request for the vehicle operator to sit on the first sitting area in the first sitting area orientation;
  - determine, based on a sensor input from the vehicle sensor, that the vehicle operator is seated on the first sitting area in the first sitting area orientation;
  - obtain a user input to maneuver the vehicle in the first direction, responsive to causing the first sitting area to swivel to the first sitting area orientation; and
  - cause the vehicle to move in the first direction based on the user input.

2. The vehicle of claim 1, wherein the processor is further configured to:
- determine a current first sitting area orientation responsive to obtaining the user request;
- compare the current first sitting area orientation with the first sitting area orientation; and
- cause the first sitting area to swivel to the first sitting area orientation when the current first sitting area orientation is different from the first sitting area orientation.

3. The vehicle of claim 1, wherein the first direction is a reverse direction opposite to a forward direction, and wherein the first sitting area faces a vehicle rear portion in the first sitting area orientation when the first direction is the reverse direction.

4. The vehicle of claim 1, wherein the first direction is a lateral sideways direction perpendicular to a forward direction, and wherein the first sitting area faces a vehicle side portion in the first sitting area orientation when the first direction is the lateral sideways direction.

5. The vehicle of claim 1, wherein the transceiver receives the user request from a user device or a vehicle Human-Machine Interface (HMI).

6. The vehicle of claim 1, wherein the processor causes the first sitting area to swivel to the first sitting area orientation by automatically swiveling and locking the first sitting area to the first sitting area orientation.

7. The vehicle of claim 1, wherein the user input comprises a user gesture to maneuver vehicle movement in the first direction.

8. The vehicle of claim 7, further comprising a vehicle camera configured to capture the user gesture, wherein the processor is further configured to:
- obtain inputs from the vehicle camera; and
- determine the user input based on the inputs from the vehicle camera.

9. The vehicle of claim 1, wherein the processor is configured to obtain the user input from a user device.

10. The vehicle of claim 9, wherein the user input comprises a user device rotation angle relative to a vehicle longitudinal axis.

11. The vehicle of claim 1, further comprising a second sitting area configured to swivel about a second sitting area axis, wherein the processor is further configured to:
- select a sitting area from the first sitting area and the second sitting area to swivel based on the first direction; and
- cause the sitting area to swivel based on the selection.

12. The vehicle of claim 1, wherein the first sitting area is a driver front side sitting area, and wherein the second sitting area is a driver rear side sitting area.

13. A method to enable vehicle movement, the method comprising:
- obtaining, by a processor, a user request to move a vehicle in a first direction;
- determining, by the processor, a first sitting area orientation associated with a first sitting area of the vehicle based on the first direction, responsive to obtaining the user request, wherein the first sitting area is configured to swivel about a first sitting area axis;
- causing, by the processor, the first sitting area to swivel to the first sitting area orientation;
- causing, by the processor, a second sitting area of the vehicle to fold based on the first direction to enhance a field of view of the vehicle operator from the first sitting area, responsive to causing the first sitting area to swivel to the first sitting area orientation;

generating, by the processor, a request for a vehicle operator to sit on the first sitting area in the first sitting area orientation;

determining, by the processor and based on a sensor input from a vehicle sensor, that the vehicle operator is seated on the first sitting area in the first sitting area orientation;

obtaining, by the processor, a user input to maneuver vehicle movement in the first direction, responsive to causing the first sitting area to swivel to the first sitting area orientation; and causing, by the processor, the vehicle to move in the first direction based on the user input.

14. The method of claim 13, wherein the first direction is a reverse direction opposite to a forward direction, and wherein the first sitting area faces a vehicle rear portion in the first sitting area orientation when the first direction is the reverse direction.

15. The method of claim 13, wherein the first direction is a lateral sideways direction perpendicular to a forward direction, and wherein the first sitting area faces a vehicle side portion in the first sitting area orientation when the first direction is the lateral sideways direction.

16. The method of claim 13, wherein causing the first sitting area to swivel to the first sitting area orientation comprises causing the first sitting area to automatically swivel and lock in the first sitting area orientation.

17. The method of claim 13, wherein the user input comprises a user gesture to maneuver vehicle movement in the first direction.

18. The method of claim 13, further comprising:

selecting a sitting area from the first sitting area and a second sitting area to swivel based on the first direction, wherein the second sitting area is configured to swivel about a second sitting area axis; and causing the sitting area to swivel based on the selection.

19. The method of claim 13, wherein the first sitting area is a driver front side sitting area, and wherein the second sitting area is a driver rear side sitting area.

20. A non-transitory computer-readable storage medium having instructions stored thereupon which, when executed by a processor, cause the processor to:

obtain a user request to move a vehicle in a first direction;

determine a first sitting area orientation associated with a first sitting area of the vehicle based on the first direction, responsive to obtaining the user request, wherein the first sitting area is configured to swivel about a sitting area axis;

cause the first sitting area to swivel to the first sitting area orientation;

cause a second sitting area of the vehicle to fold based on the first direction to enhance a field of view of the vehicle operator from the first sitting area, responsive to causing the first sitting area to swivel to the first sitting area orientation;

generate a request for a vehicle operator to sit on the first sitting area in the first sitting area orientation;

determine, based on a sensor input from the vehicle sensor, that the vehicle operator is seated on the first sitting area in the first sitting area orientation;

obtain a user input to maneuver vehicle movement in the first direction, responsive to causing the first sitting area to swivel to the first sitting area orientation; and cause the vehicle to move in the first direction based on the user input.

* * * * *